United States Patent [19]
Gaither

[11] Patent Number: 4,592,469
[45] Date of Patent: Jun. 3, 1986

[54] STORAGE CARTRIDGE FOR PLASTIC SHEET TUBING

[75] Inventor: John L. Gaither, Louisville, Ky.

[73] Assignee: Richard L. Caslin, Louisvile, Ky.

[21] Appl. No.: 768,139

[22] Filed: Aug. 22, 1985

Related U.S. Application Data

[62] Division of Ser. No. 543,615, Oct. 20, 1983, Pat. No. 4,550,553.

[51] Int. Cl.⁴ .............................................. B65D 73/00
[52] U.S. Cl. .................................... 206/494; 206/395
[58] Field of Search ............... 206/494, 395, 391, 397, 206/407, 414, 415

[56] References Cited

U.S. PATENT DOCUMENTS

| | | | |
|---|---|---|---|
| 1,819,122 | 8/1931 | Resnati | 206/494 |
| 3,836,044 | 9/1974 | Tilp et al. | 206/494 |
| 4,349,123 | 9/1982 | Yang | 206/494 |
| 4,513,862 | 4/1985 | Mallow | 206/494 |

*Primary Examiner*—Joseph Man-Fu Moy
*Attorney, Agent, or Firm*—Richard L. Caslin

[57] ABSTRACT

A long length of large plastic sheet tubing is stored in a cardboard storage cartridge having a hollow, box-like, flattened housing with a large circular opening in the top wall and a large circular opening in the bottom wall aligned with the first opening. A hollow center core is integral with the top wall and is present within the cartridge, and it is of generally cylindrical form. Both the top and bottom walls of the cartridge are of generally square form, and the top wall has downturned side flanges that have a height slightly greater than the height of the hollow center core. A long length of large plastic sheet tubing is loaded into the cartridge when the bottom wall is opened and the cartridge is inverted, where the plastic sheet tubing is folded lengthwise or compressed into the area bounded by the hollow center core and the side flanges and the top and bottom walls of the cartridge housing. Means are provided for sealing the bottom wall to the cartridge to confine the plastic sheet tubing therein. The plastic sheet tubing is paid out from the cartridge through the large opening in the bottom wall of the cartridge.

4 Claims, 6 Drawing Figures

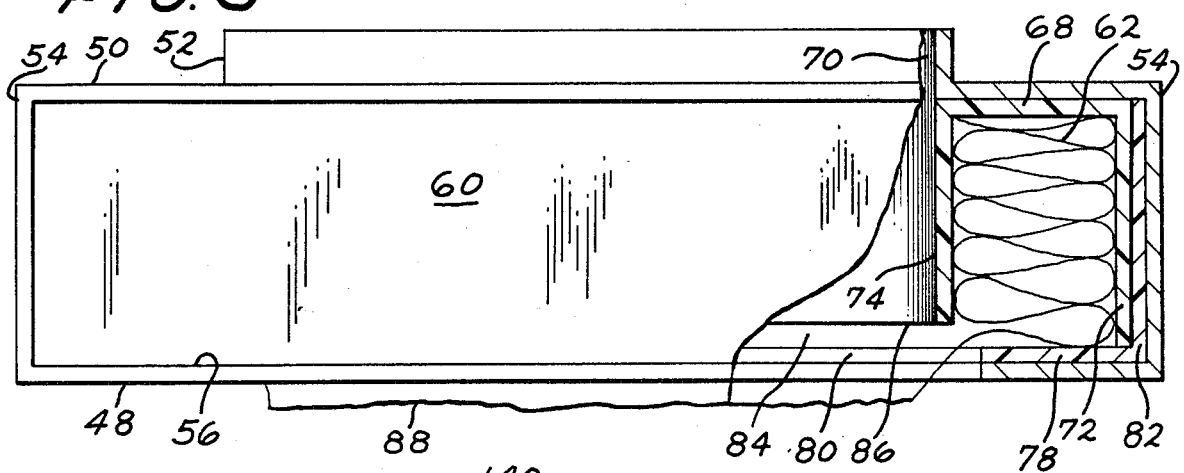
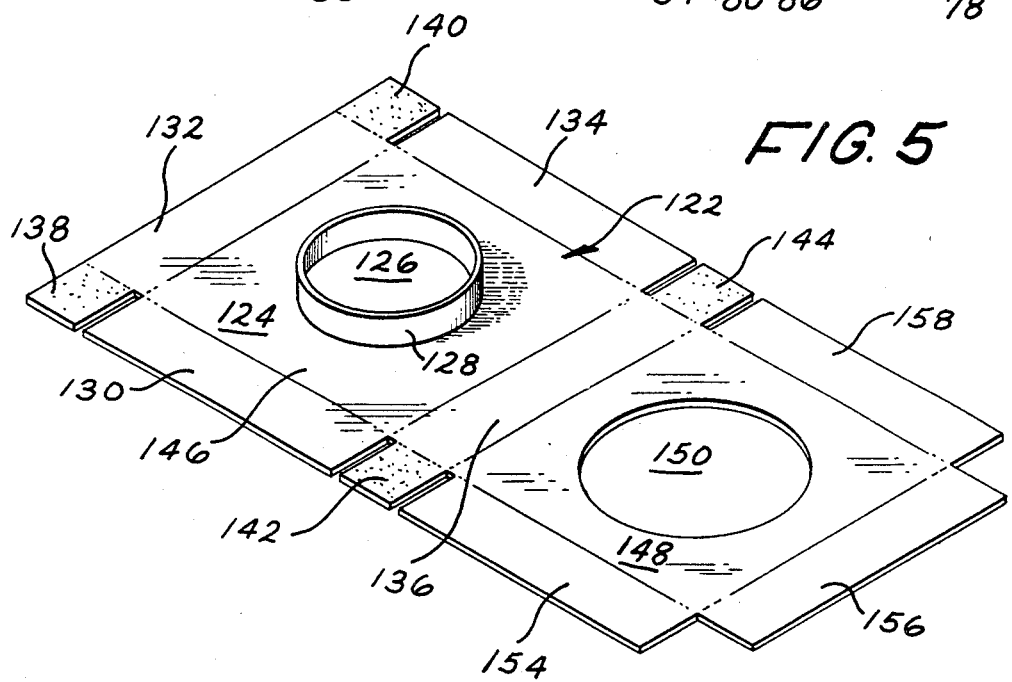
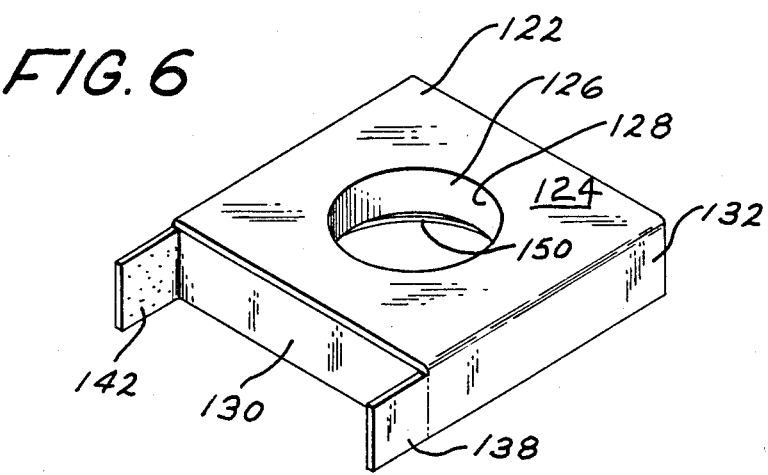

STORAGE CARTRIDGE FOR PLASTIC SHEET TUBING

This application is a divisional application claiming an invention disclosed in a prior filed, co-pending, U.S. patent application Ser. No. 543,615 filed by the present inventor, John L. Gaither, on Oct. 20, 1983, which was allowed on May 31, 1985. Now U.S. Pat. No. 4,550,553.

BACKGROUND OF THE INVENTION

1. Field of the Invention:

This invention relates to a storage cartridge for a long length of plastic sheet tubing for use with a plastic bag-forming apparatus mounted on the rear of a riding lawn mower, or the apparatus may be mounted on a trailer which is connected to the rear of a riding lawn mower. Such plastic bag-forming apparatus has recently been discovered for collecting the grass clippings, and then the bag is sealed and cut loose from the plastic sheet tubing so the bag may be discharged from the apparatus onto the ground.

2. Description of the Prior Art:

Before the present invention, the art of grass-catching apparatus used with riding lawn mowers comprised basically one or more hoppers suspended on the rear of a riding lawn mower, where the mower housing is supported under the lawn mower between the front wheels and the rear wheels. This is shown in the Rhodes U.S. Pat. No. 3,974,631, where an outlet chute is shown connected to the mower housing and rising up the side of the tractor to be discharged into the hopper for receiving the grass cuttings. When the hopper becomes full, the operator must stop the tractor, disconnect the mower blades, and remove the plastic bags lining the inside of the hopper or open the hopper so that the grass cuttings may discharge onto the ground. Still, there is a great deal of manual labor involved in collecting the grass cuttings even though using a riding lawn mower.

The first patent teaching the use of a plastic bag-forming apparatus for a riding lawn mower is believed to be the Myers U.S. Pat. No. 3,736,736. This patent describes a riding lawn mower having an attachment on one side for baling the grass clippings in a tubular plastic bag-forming system. Instead of using an outlet chute, the rotary mower has a side discharge feeding into a tubular auger housing, where the auger is driven by a belt drive from the vertical shaft of one of the rotary blades of the mower. This auger housing has perforated walls to allow for the escape of air, so that the air is separated from the grass cuttings. The auger housing feeds the cuttings into a box-like enclosure that serves as a baling attachment in cooperation with the auger housing. This enclosure is split fore-and-aft on a downwardly and outwardly inclined plane to form a top door that is hinged. Within this enclosure is fitted a reel at the discharge end of the auger housing, and this reel is loaded with plastic sheet tubing that is folded and wound on the reel or annular cartridge in such a manner that it feeds in an axial direction over the end of the reel. This Myers Patent speaks of this type of wound tubing as being available and known as "radially wound" tubing. The grass cuttings are fed from the auger housing and loaded into this plastic sheet tubing that is fed off of the reel, and, when the bag is full, the operator dismounts from the tractor and opens the top door of the enclosure and removes the filled bag, and, once the bag is on the ground, the top of the bag is stapled or sealed shut. A stapler is mounted on the rear wall of the enclosure for sealing the plastic sheet tubing at two closely-spaced locations, and the tubing is then cut to permit removal of the filled bag and to prepare the plastic sheet tubing for the next cycle of filling a bag from the auger mechanism.

The Forsgren U.S. Pat. No. 4,044,525 describes a large, heavy-duty forestry truck for use in the sawmill industry, and it includes a motor-driven crane for picking up logs and feeding them into a wood chipper mounted on the truck body. This wood chipper includes a conveying fan, where the chips are discharged into an elongated discharge pipe directed longitudinally of the truck body. This discharge pipe is fitted with a tube-like net made from textile material. The operator ties the end of the net with a rope to seal the net, and the chips are blown into the net until a bag is formed and the net is full. Then, the operator stops the cycle and climbs up on the truck and ties the net with two ropes, and then cuts intermediate these two ropes and the filled net is discharged from the truck. A long length of this tubular net material is stored on the discharge pipe.

The Wickersheim U.S. Pat. No. 4,107,903 describes a fully automatic packing apparatus for bulk goods, such as fruit. There is an inclined filling tube down which the fruit is rolled. This filling tube is elongated and is supplied with a long length of packing material is the form of a continuous supply of netting or mesh-type hose material, which appears to be of the nature of ladies' silk hose. The lower end of the filling tube is fitted with a restraining assembly in the nature of a brake ring that is controlled by means not disclosed from a sealing and severing assembly at one end of the apparatus. There is a movable carriage beneath the filling tube for automatically gathering up the mesh hose into a narrow, compact strand and introducing this hose strand into the sealing and severing assembly.

OBJECTS OF THE PRESENT INVENTION

The principal object of the present invention is to provide a compact annular cartridge for storing a long length of large plastic sheet tubing for use with a plastic bag-forming apparatus in conjunction with a riding lawn mower so as to collect the grass cuttings as they are created during the operation of the lawn mower.

A further object of the present invention is to provide an annular cartridge for holding plastic sheet tubing of the class described wherein the grass cuttings can be delivered through the hollow core of a cartridge to be caught by the plastic sheet tubing which is sealed at its lower end for collecting the grass cuttings.

A further object of the present invention is to provide an annular cartridge for dispensing large plastic sheet tubing where the cartridge is provided with restraining means so that a tension force must be applied to the plastic sheet tubing in order to remove it one length at a time from the cartridge.

A still further object of the present invention is to provide an annular cartridge for holding a long length of plastic sheet tubing where the cartridge is provided with a hollow core, and the cartridge is loaded by inverting the top wall of the cartridge and removing the bottom wall so that the tubing is packed between the outer side of the hollow core and the inner sides of the cartridge.

SUMMARY OF THE INVENTION

The present invention provides a compact annular cartridge for holding a long length of plastic sheet tubing that is folded longitudinally into the cartridge. This cartridge is formed by a flattened, box-like, housing that has a first large opening in the top wall and a second large opening in the bottom wall. A hollow core is formed within the housing, and it is supported from the top wall in alignment with the top opening. The bottom edge of the hollow core approaches the bottom wall of the housing but stops just short of it to form a narrow annular slot. The bottom wall of the housing is removable so that a long length of the plastic sheet tubing may be loaded into the cartridge and generally filling the space formed between the outside of the hollow core and the interior of the vertical walls of the housing.

BRIEF DESCRIPTION OF THE DRAWINGS

This invention will be better understood from the following description taking in conjunction with the accompanying drawings, and its scope will be pointed out in the appended claims.

FIG. 3 is an enlarged rear view of the annular cartridge shown in its supporting frame, in a manner similar to the showing of FIG. 2.

FIG. 5 is a perspective view of a second modification of the housing for this annular cartridge showing a cardboard blank laid out as one piece.

FIG. 6 is a perspective assembly view of the cardboard blank of FIG. 5 showing the blank folded into a complete box, with two of the flaps yet to be folded into place.

DESCRIPTION OF THE PREFERRED EMBODIMENTS

Figure 1:
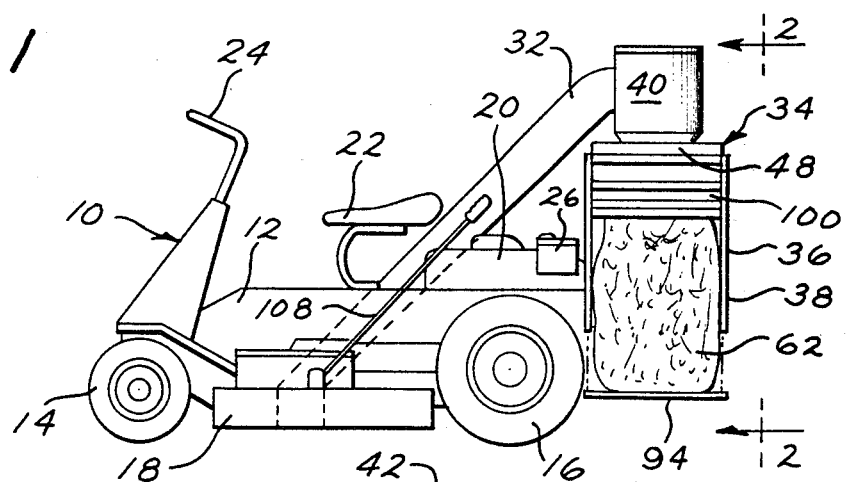
FIG. 1 is a left side elevational view of a riding lawn mower which is furnished with a plastic sheet tubing, bag-forming apparatus of which the present invention of a compact annular cartridge is one component thereof, where this bag-forming apparatus is shown mounted on the rear of the lawn mower.

Turning now to a consideration of the drawings, and in particular to the left side elevational view of FIG. 1, there is shown a standard riding lawn mower 10 having a chassis 12, a pair of front wheels 14 and a pair of rear wheels 16, and a mower housing 18 mounted on the underside of the chassis between the front and rear wheels. There is a rear-mounted engine 20 that provides the propulsion power for the mower as well as the power for driving the mower blade (not shown) within the motor housing 18. A seat 22 is provided on the chassis for accommodating the operator of the mower. Located in front of this seat is the steering wheel 24 for controlling the direction of movement of the mower. Element 26 is a small gas tank which contains the fuel for the engine 20.

On the right side of the mower 10 is a large diameter, upwardly-inclined chute 32 for transporting the grass cuttings that are discharged from the mower housing 18 up to the top of the plastic sheet tubing, bag-forming apparatus 34 which is mounted at the rear of the mower 10. The main element of this bag-forming apparatus 34 is an auxiliary frame 36 formed of hollow steel tubing 38 into a box-like housing of open construction. The open frame 36 is not fully disclosed herein because it forms part of the invention of the Parent Application Ser. No. 543,615.

Figure 2:
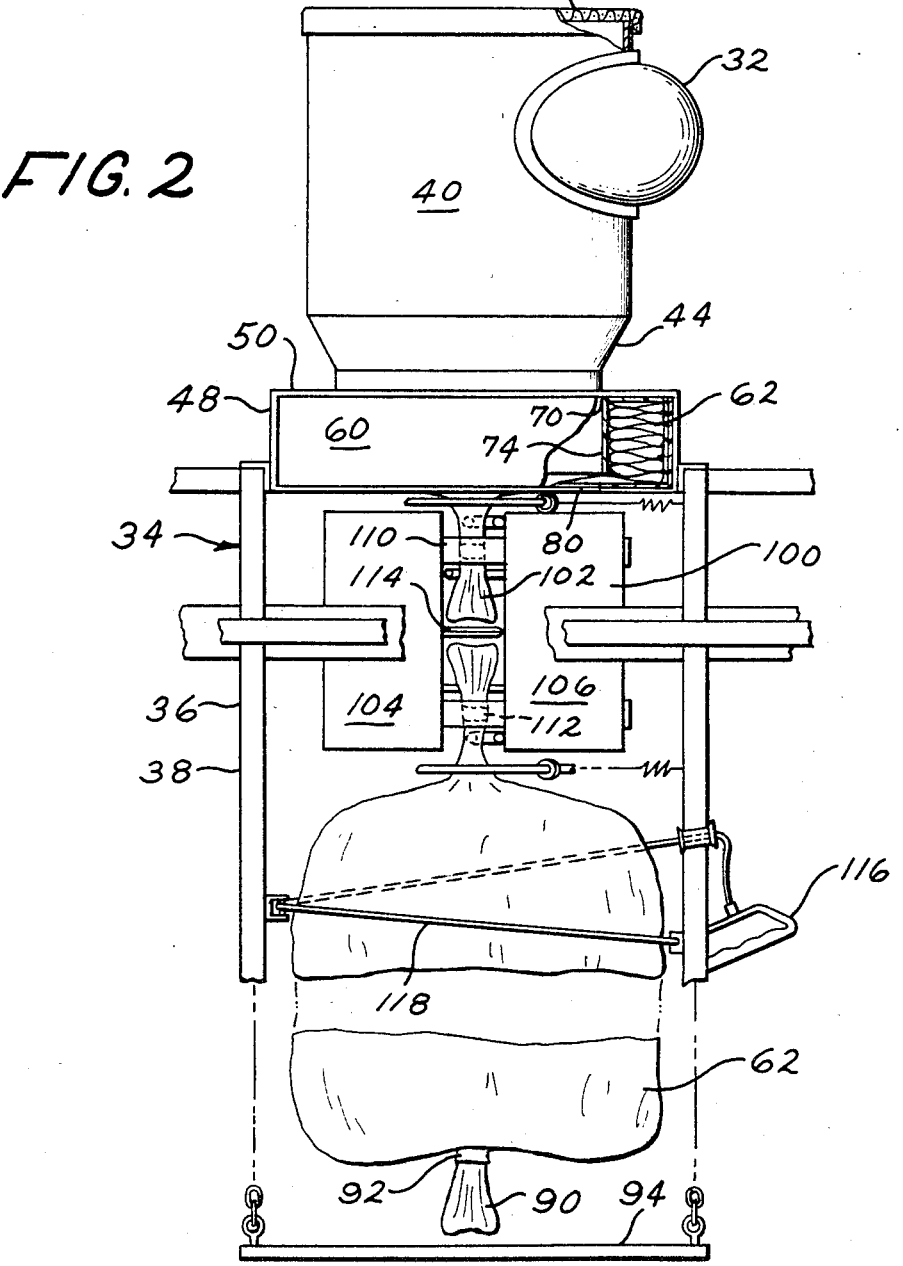
FIG. 2 is a fragmentary rear elevational view of a portion of the bag-forming apparatus, taken on the Line 2—2 of FIG. 1 showing the air release funnel at the top, and the annular cartridge of the present invention beneath the funnel, and the throttle section located beneath the cartridge for collapsing the empty top of the filled plastic bag while in place into a rope-like formation, and positioned below that is the filled plastic bag holding the grass cuttings, and finally a bag-supporting platform at the bottom to carry the weight of the bag.

A prominent feature of the bag-forming apparatus is an air-release funnel 40 which is supported at the top of the auxiliary frame 36. The upper end of the delivery chute 32 is connected tangentially into the side of this air-release funnel 40 so that the grass cuttings spin within this funnel in a whirlwind configuration, as is best seen in FIG. 2. The top wall 42 of the funnel is formed of wire screen or the like to allow the high velocity air to escape to the atmosphere so that the grass cuttings will lose their momentum and fall by gravity toward the bottom of the funnel. The lower portion of the funnel is tapered inwardly at 44 to form a smaller diameter discharge opening in the bottom wall.

Positioned beneath the lower discharge end of this funnel 40 is a sheet metal housing 48 which has a top wall 50 with a large circular opening that is provided with a vertical, peripheral flange 52, as is best seen in FIG. 3, for telescoping up into the lower discharge opening of the funnel 40. This sheet metal housing 48 has vertical side walls 54 at the front of the housing and the two opposite sides while the rear of the housing has an open wall 56 for receiving the compact cardboard cartridge 60 of the present invention for holding a large supply of large diameter plastic sheet tubing 62 that is folded longitudinally into the cartridge. This plastic sheet tubing is a very thin material similar to that of plastic bags that can be purchased in grocery stores today for use as leaf or trash bags or for filling the standard size 60 gallon trash cans that people use with matting lids for storing refuse and waste for later pickup and incineration or burial. Such plastic sheet tubing 62 may have a diameter between about 18 or 24 inches, but the exact size is not critical to the practice of the present invention. This plastic sheet tubing is compressed or folded into an accordion shape into the annular cardboard cartridge 60 as is seen in FIGS. 3-6 to assume a very compact configuration so that as much as 100 and 200 feet of this plastic sheet tubing can be stored within the cartridge 60 having a height of only several inches. It should be understood, however, that the exact amount of plastic sheet tubing packed into this cartridge may vary from one manufacturer to the next, and it is more a matter of preference than necessity.

Figure 4:
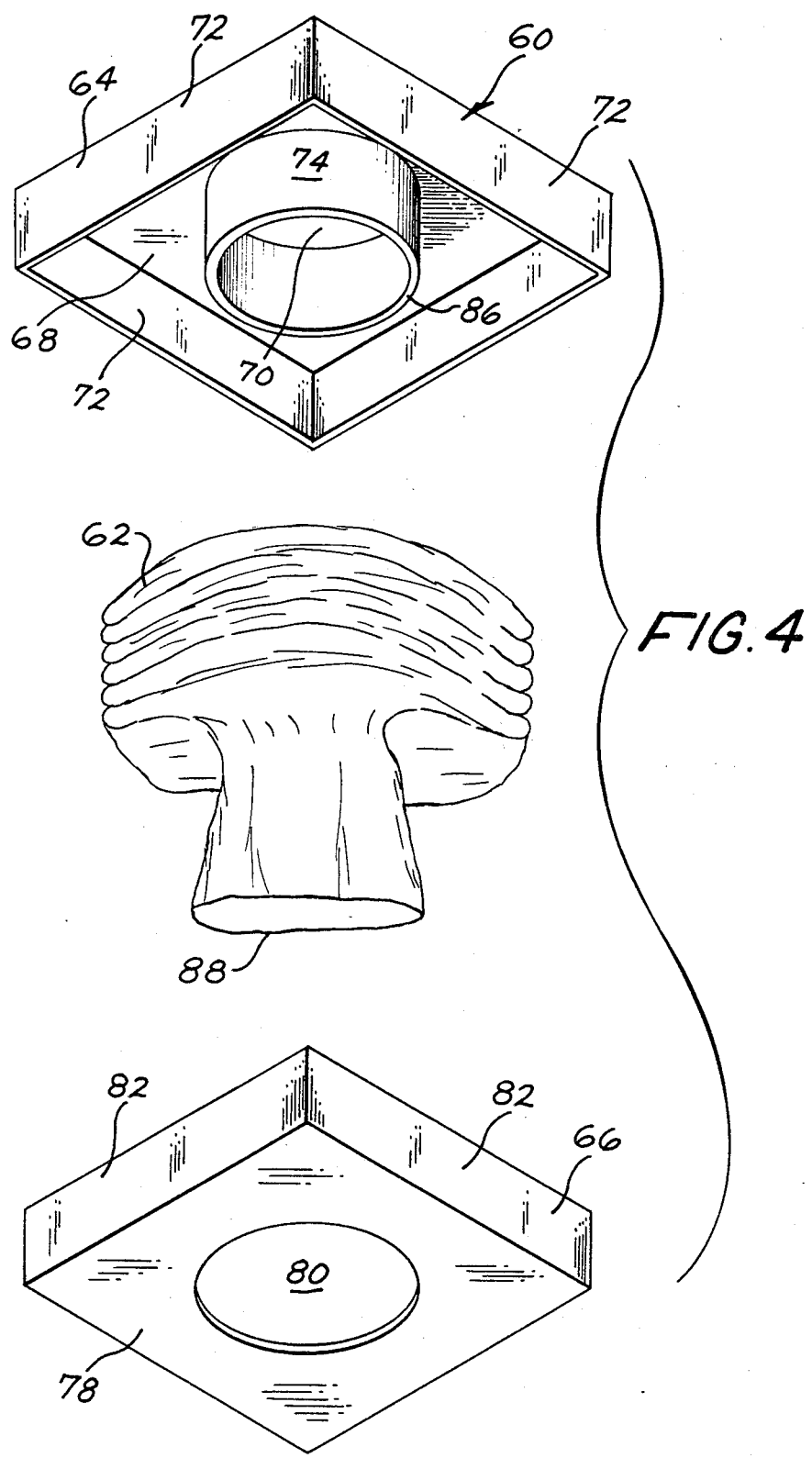
FIG. 4 is an exploded perspective view of the annular cartridge of FIG. 3 showing the top cover at the top with the integral hollow core, the large supply of plastic sheet tubing folded longitudinally so as to fit within the cartridge is seen at the middle of the Figure, while the bottom cover is shown at the bottom of the Figure.

The particular annular cartridge 60 shown in FIG. 3 is better illustrated in the exploded perspective view of FIG. 4. This cartridge comprises a hollow, box-like flattened housing 60 formed by a top cover 64 and a bottom cover 66. The top cover 64 has a top wall 68 of generally square shape with a large circular opening 70 and its side edges formed with downturned flanges 72. Suspended from the underside of the top wall 68 of the top cover 64 is a hollow core 74 that is generally cylindrical in form and it is centered around the top opening 70. The height of this core 74 is slightly less than the height of the side flanges 72, as is best seen in FIG. 3.

The annular cartridge 60 is formed of cardboard or similar low cost material so that it can be disposable when it becomes empty.

The bottom cover 66 is a part very similar to the top cover 64. The bottom cover has a bottom wall 78 that is generally of square shape in plan view, and it has a large circular opening 80 that is generally aligned with the large circular opening 70 in the top cover 64. The side edges of this bottom wall 78 are formed with upturned flanges 82 which are attached together at the corners and which are adapted to telescope with respect to the downturned flanges 72 of the top cover 64. Notice in FIG. 3 that there is an annular slot 84 formed between the lower peripheral edge 86 of the core 74 and the adjacent inner surface of the bottom wall 78 of the bottom cover 66.

In order to load this long length of plastic sheet tubing 62 into this cartridge 60, it is first necessary to remove the bottom cover 66 from the top cover and to invert the top cover with the intent of folding or compacting the long length of plastic sheet tubing 62 into the space created by the exterior surface of the hollow core 74 and the interior walls of the four side flanges 72. This plastic sheet tubing is formed in the factory in the shape of a tube and the tube is closed to form a double thickness of plastic sheet that is then stored on a large roll. A large cylinder of about the same diameter as the hollow core 74 is positioned above the core and the plastic sheet tubing is opened as it comes off of the reel and it is threaded onto the top end of this large cylinder (not shown). Then the tubing is fed down from the cylinder from which it descends into the interior of the top cover 64 to assume generally accordion folds in a haphazard pattern to generally fill the space created between the exterior surface of the hollow core 74 and the interior surface of the side flanges 72. The free end 88 of the tubing 62 is pulled toward the center of the hollow core 74 so that it is accessible. Then the lower cover 66 is applied to the top cover and adhesive tapes (not shown) may be used to seal the top and bottom covers together to ensure that they do not become separated during storage or transit.

In the assembly view of FIG. 3 it should be clear to those skilled in this art that the entire weight of the annular roll of compact plastic sheet tubing 62 is on the bottom wall 78 of the bottom cover 66 and this serves to restrain or resist any pull placed on the free end 88 of the tubing. The first step in the use of the present invention is to pull enough plastic sheet tubing out from the cartridge 60 so that the end of the tubing can be gathered into a rope-like configuration as shown at 90 at the bottom of FIG. 2 so that a strip of sealing tape 92 can be wrapped around the gathered tubing so as to seal the lower end of the tubing. This first step of sealing the end of the tubing is done manually, but it need not be repeated once the bag-forming apparatus is in full operation. Also the narrowness of the annular slot 84 through which the tubing must be pulled serves to exert a restraining force on the tubing so that it does not have a tendency to fall out of the cartridge 60 in bulk for this would render the system inoperative. The objective is to dispense the plastic sheet tubing one bag length at a time as the grass cuttings are discharged into the air-release funnel and they descend by gravity through the interior of the hollow core 74 and begin to build up within the sealed tubing so that the accumulative weight of the cuttings will increase to such a point that the tubing will be unable to withstand this weight and the tubing will pay out until the sealed end of the tubing descends to the supporting platform 94 at the bottom of the auxiliary frame 36. Preferably the plastic sheet tubing 62 is of transparent or translucent material so that the operator of the lawn mower can be aware of the growing height of the grass cuttings within the plastic bag so that the operator will always stop the mower and disconnect the rotating blade so as to discontinue the delivery of the grass cuttings into the bag before the bag becomes overfilled.

Located beneath the sheet metal housing 48 that contains the annular cartridge 60 for the plastic sheet tubing 62 is a throttle section 100 which is provided with mechanisms for collapsing the empty top of the large plastic bag into a ropelike formation 102 for a vertical length of about 6 to 8 inches, as is illustrated in FIG. 2. This throttle section 100 includes two track-mounted carriages 104 and 106 which are normally widely spaced from each other to each side of the auxiliary frame 36. A pivoted hand lever 108 is shown at the left side of the mower in FIG. 1 convenient to the operator and it is this lever which controls the relative movement of these two carriages 104 and 106 in effecting the throttling action to gather the empty top of the plastic bag into the rope-like formation 102. There is no reason to go into the details of construction of this throttle section because it does not form part of the present invention but instead is covered by the Parent Application of the present inventor Ser. No. 543,615 identified above. Associated with one carriage 104 are a pair of vertically spaced tape dispensers 110 and 112 which serve to apply a strip of adhesive tape around the rope-like formation at the two elevations just prior to the time the tubing is cut by means of the cutter blade 114 that is likewise supported from the carriage 104. This blade serves to sever the tubing and disassociate the sealed bag from the supply of plastic tubing 62 within the annular cartridge 60. Notice the hand grip 116 in FIG. 2 formed on the end of the cable 118 which can be used by the operator for ejecting the filled bag from the supporting platform 94 in preparation for repeating the cycle of forming the bag, filling the bag, sealing the bag and ejecting the bag, over and over again until the lawn is completely trimmed.

FIGS. 5 and 6 show a second modification of the annular cartridge 60 which is identified as cartridge 122. This is a one piece design as is shown in the cardboard blank of FIG. 5. There is a top wall 124 formed with a circular opening 126 that is fitted with a hollow core 128, similar to the core 74 of the first modification of FIG. 4. The side edges of the top wall 124 are provided with side flanges 130, 132, 134 and 136. The side flange 132 has end flaps 138 and 140, while side flange 136 has end flaps 142 and 144. Thus this annular cartridge 122 has a top cover 146 that is completed when the side flanges 130, 132, 134 and 136 are folded up vertically along their fold lines, and then the adjacent side flanges are fastened together by gluing the end flaps against the adjacent side flange, as best seen in FIG. 6. It is in this position that the top cover 146 would then be inverted and the plastic sheet tubing 62 would be loaded into the top cover.

Notice that the bottom cover is formed by the bottom wall 148, which is integral with the side flange 136. In other words, this is a one-piece box or cartridge 122.

This bottom wall 148 has a large circular opening 150 that is generally in alignment with the circular opening 126 in the top wall 124. The top wall also has the hollow core 128 that is equivalent to the hollow core 74 of the first modification of FIG. 4. This bottom wall 148 has side flanges 154, 156 and 158 which fold inside the cooperating flanges 130, 134 and 136 respectively. Then the box or cartridge would be sealed closed by an adhesive tape, or the like (not shown). This second modification of annular cartridge 122 is made differently than the first cartridge 60, but it performs the same function and operates in basically the same way as the first modification.

Modifications of this invention will occur to those skilled in this art. Therefore, it it to be understood that this invention is not limited to the particular embodiments disclosed but that it is intended to cover all modifications which are within the true spirit and scope of this invention as claimed.

What is claimed is:

1. A compact annular cartridge holding a supply of large plastic sheet tubing that is folded longitudinally into the cartridge, where the cartridge comprises:
   a. a hollow, box-like, flattened housing having a first large opening in the top wall and a second large opening in the bottom wall generally aligned with the first opening;
   b. a hollow core formed in the housing and centered with respect to the top opening and suspended from the top wall a distance that would provide a narrow slot between the periphery of the bottom opening and the periphery of the bottom edge of the core;
   c. the bottom wall of the housing being removable so that a long length of the said large plastic sheet tubing may be loaded into this cartridge housing in the area bounded by the outside of the hollow core and the interior of the vertical walls of the housing, and the said narrow slot serves as a restraining means for resisting the wholesale removal of the plastic sheet tubing from the cartridge so the sheet tubing may be dispensed only one length at a time through the slot by exerting a tension force on the end of the sheet tubing positioned within the bottom opening.

2. The invention as recited in claim 1 wherein the said box-like cartridge housing is formed of cardboard, where the hollow center core is generally cylindrical in form and is integral with the top wall, and the top wall is generally of square shape, having side edges formed with downturned flanges having a height slightly greater than the height of the center core, the said bottom wall of the cartridge being of generally square shape, similar to that of the top wall, and being integral with at least one of the side flanges of the top wall, generally along the line of the lower edge of said flange, so that the bottom wall may be hinged to the cartridge so that it may be swung open so as to gain access to the interior of the cartridge through the bottom wall area for loading the long length of large plastic sheet tubing, where the diameter of the plastic sheet tubing is greater than the diameter of the hollow center core, and means for sealing the bottom wall closed with relation to the side flanges of the cartridge for forming a closed cartridge, whereby the large plastic sheet tubing is stored within the cartridge when the cartridge is opened at the bottom wall and inverted so that the plastic sheet tubing can be loaded into the cartridge by compressing the length of the tubing by folding the tubing lengthwise within the area bounded by the hollow center core and the four side flanges of the top wall of the cartridge housing.

3. The invention as recited in claim 1 wherein the size of the large opening in the bottom wall of the housing is about equal to the size of the large opening in the top wall of the housing, and the housing and core are formed of a cardboard material so as to be dispensable.

4. The invention as recited in claim 1 wherein the said box-like cartridge housing is formed of cardboard having a top cover with a top wall and plurality of vertical side flanges, and there being a bottom cover member with a bottom wall and a plurality of vertical flanges for receiving the side flanges of the top cover, where the said narrow slot is formed between the bottom edge of the hollow core and the inner surface of the bottom wall of the bottom cover, where the weight of the folded plastic sheet tubing loaded into the housing is generally carried by the bottom wall of the bottom cover so that it is necessary to pull the plastic sheet tubing through the narrow annular slot against the restraining force created by the weight of the plastic sheet tubing on the bottom wall of the bottom cover.

* * * * *